(12) United States Patent
Leach

(10) Patent No.: US 9,537,266 B1
(45) Date of Patent: Jan. 3, 2017

(54) POWER STRIPS WITH VOICE MESSAGE PLAYBACK

(71) Applicant: Justin James Leach, Phoenix, AZ (US)

(72) Inventor: Justin James Leach, Phoenix, AZ (US)

( * ) Notice: Subject to any disclaimer, the term of this patent is extended or adjusted under 35 U.S.C. 154(b) by 0 days.

(21) Appl. No.: 14/880,129

(22) Filed: Oct. 9, 2015

Related U.S. Application Data

(60) Provisional application No. 62/062,752, filed on Oct. 10, 2014.

(51) Int. Cl.

| | | |
|---|---|---|
| G08B 21/00 | (2006.01) | |
| G08B 13/12 | (2006.01) | |
| H02B 1/00 | (2006.01) | |
| H02H 3/00 | (2006.01) | |
| H04R 29/00 | (2006.01) | |
| H04M 1/64 | (2006.01) | |
| H04M 3/22 | (2006.01) | |
| H01R 13/70 | (2006.01) | |
| H01R 13/66 | (2006.01) | |
| G11B 20/10 | (2006.01) | |
| G08B 3/10 | (2006.01) | |

(52) U.S. Cl.
CPC ............ *H01R 13/6691* (2013.01); *G08B 3/10* (2013.01); *G11B 20/10527* (2013.01); *H01R 13/6683* (2013.01); *G11B 2020/10546* (2013.01)

(58) Field of Classification Search
CPC ... H01R 13/70; H01R 13/717; G08B 13/1409; G01R 31/343; H02H 1/0015; H04R 29/001; H04M 3/22; H04M 3/4938; H04M 3/533
USPC .... 340/656, 568.4, 635, 568.3; 361/601, 42; 381/59; 379/88.17, 22, 67.1; 200/51.1
See application file for complete search history.

(56) References Cited

U.S. PATENT DOCUMENTS

| | | | | |
|---|---|---|---|---|
| 5,434,558 A | * | 7/1995 | Zeder ................ | G08B 13/1409 200/51.1 |
| 7,009,514 B2 | * | 3/2006 | Dupeire ................... | H02G 1/00 340/568.4 |
| 2003/0063716 A1 | * | 4/2003 | Turner .................... | H04M 1/21 379/67.1 |
| 2005/0163291 A1 | * | 7/2005 | Turner .................... | H04M 1/21 379/88.17 |
| 2006/0070277 A1 | * | 4/2006 | Bungerz ................... | G09F 3/00 40/544 |
| 2007/0275594 A1 | * | 11/2007 | Greenberg ............. | H01R 13/72 439/501 |

(Continued)

*Primary Examiner* — Kerri McNally
*Assistant Examiner* — Munear Akki

(57) ABSTRACT

Power strips are provided having voice message playback capabilities, which enable a user to selectively playback stored voice messages or verbal memorandum identifying the particular electronic devices plugged into the power strip outlets. In this manner, a user need only trigger playback of a voice message to determine the identity of an electronic device plugged into a given outlet. This may be particularly beneficial when several electronic devices are plugged into the power strip, which is located underneath a desk, behind an entertainment center, or in another difficult-to-access area. In certain embodiments, the power strip enables the user to record personalized voice messages identifying the electronic devices plugged into the power strip outlets, possibly along with additional information pertaining to the plugged-in devices and considered pertinent by the user. Embodiments of the power strips described herein may also be beneficially used by the blind and visually impaired.

20 Claims, 1 Drawing Sheet

(56) References Cited

U.S. PATENT DOCUMENTS

| | | | | |
|---|---|---|---|---|
| 2011/0205693 A1* | 8/2011 | Jansma | ................... | G06F 1/266 361/601 |
| 2014/0098445 A1* | 4/2014 | Hooper | ................... | H02H 3/16 361/42 |
| 2014/0334640 A1* | 11/2014 | Chan | ...................... | G06F 1/266 381/98 |

* cited by examiner

POWER STRIPS WITH VOICE MESSAGE PLAYBACK

RELATED APPLICATION

This application claims priority to provisional U.S. patent application Ser. No. 62/062,752, filed with the USPTO on Oct. 10, 2014.

TECHNICAL FIELD

The present invention relates generally to power strips and, more particularly, to power strips having voice message playback capabilities, which enable a user to playback stored voice messages identifying which, if any, electronic devices have been plugged into the outlets of the power strip.

BRIEF DESCRIPTION OF THE DRAWINGS

At least one example of the present invention will hereinafter be described in conjunction with the following figures, wherein like numerals denote like elements, and.

Figure 1:
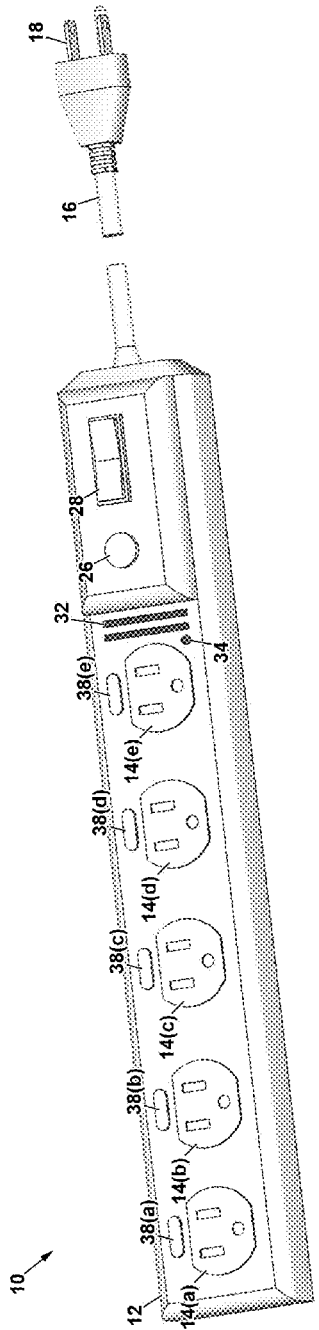
FIG. 1 is an isometric view of a power strip having voice message recording and playback capabilities, as illustrated in accordance with an exemplary embodiment of the present invention.

For simplicity and clarity of illustration, the drawing figures illustrate the general manner of construction, and descriptions and details of well-known features and techniques may be omitted to avoid unnecessarily obscuring the exemplary and non-limiting embodiments of the invention described in the subsequent Detailed Description.

DETAILED DESCRIPTION

The following Detailed Description is merely exemplary in nature and is not intended to limit the invention or the application and uses of the invention.

As appearing herein, the term "power strip" is defined to include any device or apparatus that: (i) plugs into or connects to an electrical outlet, and (ii) has two or more sockets or outlets into which other electronic devices or components can be plugged. The word "strip," as appearing in the term "power strip," thus does not imply that the power strip has any particular shape or form factor. While the power strip described herein may have an elongated, strip-like or bar-like form factor in certain embodiments, this is not necessary in all implementations. For example, in other implementations, the power strip can have a more stylized or streamlined form, such as an ovular, rounded, serpentine, multi-lobed, or pyramidal form. The power strip can also assume the form of a block-like or plate-like device, which lacks a power cord and which plugs directly into a wall outlet in certain embodiments (commonly referred to as a "multi-outlet adapter"). Embodiments of the power strip need only provide the basic function of a power strip (namely, enabling multiple electronic devices to be connected to a common electrical outlet) in addition to the below-described voice message playback functionality. This notwithstanding, certain embodiments of the power strip may provide other functions, as well, such as surge protection and/or battery power reserve.

Embodiments of the power strip are imparted with voice message playback capabilities, which enable a user to playback stored voice messages or verbal memorandum ("memos") identifying which, if any, electronic devices have been plugged into the sockets or outlets of the power strip. To provide this functionality, a voice message playback system is coupled to (e.g., integrated or built into) the housing of the power strip. The voice message playback system stores a number of voice messages, which are each assigned to a different power strip outlet. Playback of the voice messages can be triggered by a user through a user interface. By way of example, the user interface can assume the form of a plurality of buttons or other physical user inputs, each corresponding to a different outlet of the power strip. A user may trigger playback of the voice message assigned to a selected outlet by actuating the user input (e.g., pressing the button) dedicated to the selected outlet. When a particular user input is actuated, the voice message playback system may then play the corresponding voice message to provide an audible reminder identifying which electronic device is plugged into the selected outlet. This may be particularly desirable when it is otherwise inconvenient for the user to determine which device is plugged into the selected outlet, such as when a relatively large number of devices are plugged into the outlets of the power strip and/or the power strip is located under a desk, behind an entertainment center, or in another difficult-to-access area. Embodiments of the power strips described herein may also be useful to the blind and visually impaired.

In embodiments, the voice messages can be prerecorded at the time of power strip manufacture, in which case the user may choose amongst a list of voice messages to select the voice messages properly identifying the electronic device plugged into each of the power strip outlets. In other embodiments, the voice message playback system further enables a user to record and rerecord, as desired, the voice message or verbal memo assigned to each outlet. For example, in embodiments wherein dedicated user inputs are provided corresponding to each outlet, a user can record the voice message assigned to a selected outlet by actuating the associated user input in a predetermined manner; e.g., the user may press and hold a button adjacent the selected outlet for a period of a few seconds to commence recording or rerecording of the voice message assigned to the selected outlet. The user can then simply annunciate the particular electronic device that is plugged into the outlet when, for example, the user first plugs the device into the outlet. At a later time when the user (or a different person) wishes to confirm which electronic device has been plugged into a selected outlet, the user need only actuate the user input (e.g., press the button) dedicated to the selected outlet to initiate playback of the previously-recorded voice message assigned to the selected outlet. If desired, the user can also record other information on the voice message pertaining to the plugged-in device, such as a password associated with a computer, a wireless router, or the like.

FIG. 1 is an isometric view of a power strip 10, as illustrated in accordance with an exemplary embodiment of the present invention. Power strip 10 includes a body or housing 12 having a number of electrical outlets 14(a)-(e) thereon. In this particular example, power strip 10 includes five outlets 14(a)-(e) positioned in a single row in a side-by-side relationship. In other embodiments, power strip 10 can include a greater or lesser number of outlets (providing that strip 10 includes at least two outlets), which can be disposed in a various other spatial arrangements. The shape and construction of housing 12 will vary in conjunction with the number and disposition of outlets 14. Thus, while having a traditional, strip- or bar-shaped form factor in the illustrated example, housing 12 can be imparted with various other form factors in alternative embodiments including more contoured or streamlined shapes. It is also possible for housing 12 to be divided into two or more portions or units, which may be hinged, slidably coupled, or otherwise movable with respect to one another. In certain cases, housing 12 can be divided into multiple portions or units, which can be detached and reattached by a user to alter the manner in which outlets 14(a)-(e) are spatially arranged. In further embodiments, power strip 10 can be produced such that one or more of outlets 14(a)-(e) can swivel, rotate, or otherwise move with respect to housing 12. In still further embodiments, relatively short connective cords can also been provided between housing 12 and one or more of outlets 14(a)-(e). Outlets 14(a)-(e) can assume any form into which the plug of an electronic device, component, or piece of equipment can be matingly inserted. This includes all types of Alternating Current (A/C) outlets (e.g., NEMA connectors) and Universal Serial Bus (USB) charging ports. While including a single type of outlet in the illustrated example, power strip 10 can be produced to include two or more different types of outlets in further embodiments.

As depicted in FIG. 1, power strip 10 further includes an elongated power cord 16, which extends from housing 12 and terminates in a multi-pronged power plug 18. In the illustrated example, power plug 18 is a grounded, straight blade NEMA plug suitable for mating insertion into a NEMA electrical outlet of the type commonly found throughout North America. In further embodiments, power plug 18 can assume various other forms suitable for mating insertion into any other type of electrical outlet, whether utilized predominately in North America and in another part of the world. Power cord 16 can be eliminated in embodiments wherein power plug 18 (or, specifically, the prongs of plug 18) extend directly from the backside of housing 12. In this case, and by way of non-limiting example, power strip 10 may assume the form of a multi-outlet adapter having a plate-like or block-shaped body, which is positioned flush against a wall bearing the electrical outlet into which power strip 10 is plugged.

In certain embodiments, power strip 10 can be equipped with a surge protection device or system for limiting the voltages applied to outlets 14(a)-(e) and, therefore, to the electronic devices plugged into outlets 14(a)-(e). This may be appreciated more fully by referring to FIG. 2, which is a schematic diagram of power strip 10. As generically illustrated in FIG. 2, power strip 10 includes an internal surge protector 20 electrically coupled between outlets 14(a)-(e) and the conductor ends of power cord 16 terminating within housing 12 (represented by box 22). Surge protector 20 can include Metal Oxide Varistors (MOVs), a Gas Discharge Arrestor (GDA), or any other structure, device, or combination of devices suitable for limiting the transient voltage applied to outlets 14(a)-(e). Additionally, as shown in FIG. 1, a RESET button 24 can be provided on the exterior of housing 12 in embodiments wherein power strip 10 includes a resettable circuit breaker. If desired, a toggle switch 26 can further be provided on the exterior of housing 12 to allow power strip 10 to be switched between ON and OFF states.

Figure 2:
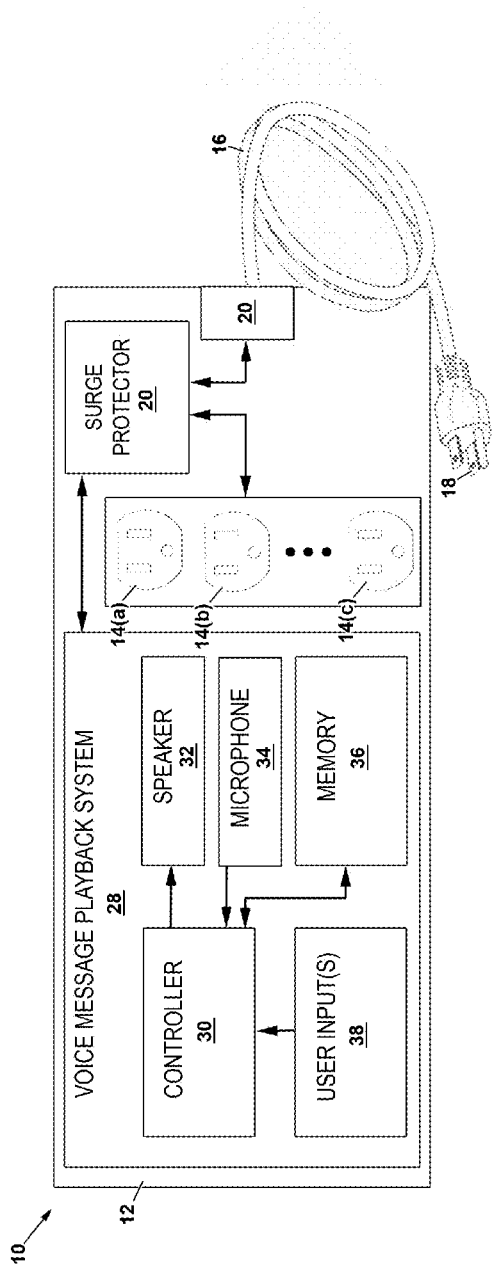
FIG. 2 is a schematic diagram of the exemplary power strip shown in FIG. 1.

As shown most clearly in FIG. 2, a voice message playback system 28 is further coupled to or integrated into power strip 10. Voice message playback system 28 includes a controller 30; a speaker 32 coupled to a first output of controller 30; a microphone 34 coupled to a first input of controller 30; and a memory 36 coupled to a second input and a second output of controller 30. Controller 30, speaker 32, microphone 34, and memory 36 are contained within housing 12 in the illustrated example. Controller 30 can include any number of components, whether implemented as hardware, software, firmware, and/or the like, designed to carry out the below-described voice message playback and recording functions. In one embodiment, controller 30 is a microprocessor assuming the form of or including an Application Specific Integrated Circuit (ASIC). Memory 36 is preferably non-volatile and can assume any form suitable for storing a plurality of voice messages therein. Although illustrated as a separate block in FIG. 2, memory 36 can be integrated into controller 30 in certain embodiments. Similarly, although illustrated as separate boxes in FIG. 2, speaker 32 and microphone 34 can be implemented as a single device in at least some embodiments.

As indicated above, memory 36 stores a plurality of voice messages or verbal memos therein. In an embodiment, the number of voice messages stored in memory 36 is equal to the number of outlets 14(a)-(e), and each stored voice message is assigned to or corresponds with a different outlet 14(a)-(e). In response to user commands, controller 30 causes one or all of the voice messages stored in memory 36 to be played or annunciated over speaker 32. In other embodiments, controller 30 receives user commands selecting a specific outlet 14(a)-(e) and then triggers playback of only the specific voice message assigned to the selected outlet 14(a)-(e). The user commands are received via a user interface included in playback system 28. Various different types of user interfaces can be employed for this purpose including, for example, a single physical user input, such as a depressible dial, that can be controlled by a user to perform the below-described control functions. In other embodiments, a voice-based interface can be utilized, in which case playback system 28 may lack physical controls. In such embodiments, controller 30 can be imparted with voice recognition capabilities such that a user may verbally command playback system 28 to perform the below-described functions. In still further embodiments, the user interface of playback system 28 assumes the form of a plurality of physical user inputs 38(a)-(e), each dedicated to a different outlet 14(a)-(e). In the illustrated example, user inputs 38(a)-(e) are buttons and will consequently be referred to hereafter as "buttons 38(a)-(e)," respectively. It will be appreciated, however, buttons 38(a)-(e) can be replaced with other types of dedicated user inputs, such as switches, in further embodiments.

In certain embodiments, buttons 38(a)-(e) can be grouped in a cluster on housing 12 and visually associated with outlets 14 utilizing, for example, text (e.g., numbers may appear adjacent each button corresponding to the outlet number from left to right), color coding (e.g., each button-outlet pair may be imparted with a different color), or another visual indicator. In this case, the button cluster might be located on an end portion of housing 12 or, in embodiments wherein housing 12 includes a swing-out cover, on the underside of the cover. Alternatively, the button cluster can be positioned at a different location. In further embodiments, and as indicated in FIG. 1, buttons 38(a)-(e) are positioned on housing 12 such that each button is located adjacent the outlet 14(a)-(e) to which the button is dedicated. Stated differently, buttons 38(a)-(e) can be positioned such that each button is located closer to its corresponding outlet 14(a)-(e) than to any other outlet. In this manner, a user need only glance at power strip 10 to determine which of buttons 38(a)-(e) are dedicated to which of outlets 14(a)-(e). Buttons 38(a)-(e) are also usefully positioned to remain uncovered when larger A/C adapters are plugged into outlets 14(a)-(e). For example, as indicated in FIG. 1, buttons 38(a)-(e) can be positioned above outlets 14(a)-(e) opposite the female ground terminal of each outlet 14.

A user can trigger playback of the voice message assigned to or corresponding with a selected outlet 14(a)-(e) by actuating the user input dedicated to the selected outlet in a first manner. In the illustrated example shown in FIG. 1, a user may simply press or tap the button 38(a)-(e) located adjacent the selected outlet 14(a)-(e) to trigger playback of the voice message or verbal memo assigned to the selected outlet 14(a)-(e). In such embodiments, a user only briefly depress the appropriate button for a time period less than a predetermined threshold of, for example, three seconds to trigger playback of the corresponding voice message. Controller 30 receives a signal from the depressed button 38(a)-(e) and, in response thereto, identifies the voice message or track stored in memory 36 assigned to the depressed button 38(a)-(e). Controller 30 then causes the corresponding voice message to be audibly played over speaker 32.

As noted above, voice message playback system 28 can further enable a user to record and rerecord, as desired, the voice messages or verbal memos assigned to each of outlets 14(a)-(e). In one embodiment, the user can initiate recording of a voice message corresponding to a selected outlet 14(a)-(e) by actuating the user input dedicated to the selected outlet 14(a)-(e) in a second manner different than the first manner. In the illustrated example wherein the user inputs assume the form of buttons located adjacent their corresponding outlets, a user may hold the button 38(a)-(e) adjacent a selected outlet 14(a)-(e) for time period exceeding the predetermined threshold (e.g., three seconds) to initiate recording or rerecording of the voice message assigned to the selected outlet 14(a)-(e). Controller 30 then captures the new audio recording, as detected utilizing microphone 34, and overwrites the voice message stored in memory 36. The updated or rerecorded voice message is stored in memory 36 for subsequent playback or, alternatively, until the user again rerecords the voice message by performing the steps just described. The length of the voice message can be fixed at a predetermined duration of, for example, 5-10 seconds. Alternatively, controller 30 can enable a user to record the voice message for a variable period of time (e.g., for as long as the button is depressed), while possibly limiting the duration of the voice message to a maximum length of, for example, 20-30 seconds. When power strip 10 is first manufactured, a pre-stored voice message can be recorded in memory 36 indicating the manner in which a user can rerecord the voice message assigned to each outlet 14(a)-(e). Thus, if a user has not yet recorded a voice message corresponding to the selected outlet 14(a)-(e), the pre-stored voice message can be played to prompt the user to create his or her own voice message overwriting the pre-stored voice message (thus, effectively rerecording the voice message assigned to the outlet).

There has thus been provided at least one example of a power strip enabling a user to selectively playback voice messages indicating which, if any, electronic device has been plugged into each outlet of the power strip. In so doing, the power strip enables the user to avoid the often cumbersome process of tracing back cords in an effort to determine which device is currently plugged into which outlet. Additionally, such a voice message playback system may aid in the identification of devices plugged into the power strip by individuals lacking sight or that are visually impaired. In certain embodiments, the power strip also enables the user to record and rerecord the voice messages, as desired, to create personalized verbal memos identifying which electronic devices plugged are plugged into which outlets of the power strip. The user can also include other information in the voice messages that he or she considers pertinent, such as a password pertaining to one or more of the electronic devices. In some implementations, the user interface of the voice message playback system can assume the form of a plurality of buttons, each dedicated to a different outlet of the power strip. In such embodiments, the voice message playback system can enable the user to record and rerecord the voice memo corresponding to a selected outlet when, for example, the button dedicated to the selected outlet is held for a predetermined period. When the button dedicated to the selected outlet is instead briefly depressed or tapped, the voice message playback system can play the current version of the voice message corresponding to the selected outlet.

In one embodiment, the power strip includes a housing having multiple outlets into which a number of electronic devices can be plugged. A voice message playback system is integrated or built into the housing and configured to record and playback voice messages identifying which electronic devices are plugged into which of the multiple outlets. The voice message playback system can also include a plurality of user inputs located on the housing, each corresponding with or dedicated to a different outlet. The voice message playback system may further be configured to: (i) play the voice message corresponding to a selected outlet when the user input dedicated thereto is actuated in a first manner, and (ii) rerecord the voice message corresponding to the selected outlet when the user input associated therewith is actuated in a second manner. The plurality of user inputs may assume the form of a plurality of buttons, with each button located adjacent the outlet to which the button is dedicated.

In a further embodiments, the power strip includes a housing, multiple outlets disposed on or otherwise coupled to housing, and a voice message playback system. The voice message playback system can include: (i) a memory disposed in the housing and configured to store voice messages identifying which electronic devices are plugged into which of the multiple outlets, (ii) a user interface, and (iii) a controller coupled to the memory and to the user interface. The controller may be configured playback the voice messages stored in the memory in response user commands received via the user interface. In certain embodiments, the user interface may assume the form of a plurality of dedicated user inputs located on the housing and each dedicated to a different outlet. Additionally or alternatively, the voice message playback system may further enable a user to rerecord the voice message corresponding to any one of the multiple outlets, as selected by the user via the user interface.

In still further embodiments, the power strip can include: (i) a housing having first and second outlets thereon, and (ii) a voice message playback system. The voice message playback system can include, in turn: (ii) (a) first and second user inputs located on the housing; (ii)(b) a memory disposed in the housing and configured to store first and second voice messages; (ii)(c) a speaker coupled to the housing; and (ii)(d) a controller coupled to the first and second user inputs, to the memory, and to the speaker. The controller is configured to play the first voice message through the speaker when the first user input is actuated and to play the second voice message through the speaker when the second user input is actuated. The voice message playback system can be configured to enable the first and second voice messages to be recorded and rerecorded by a user to identify which devices are plugged into which of the first and second outlets. The first and second user inputs can assume the form of first and second buttons, respectively; and the controller may be configured to play the first voice message through the speaker when the first button is pressed for a time period less than a predetermined threshold and to playback the second voice message through the speaker when the second button is pressed for a time period less than the predetermined threshold. In certain cases, the voice message playback system may further include a microphone coupled to the controller, and the controller may be configured to rerecord the first voice message over the microphone when the first button is held for a time period greater than the predetermined threshold and to rerecord the second voice message over the microphone when the second button is pressed-and-held for a time period greater than the predetermined threshold.

As explained above, it is preferred that the voice message playback system is integrated into or built into the power strip housing. However, the possibility that the voice message playback system can be contained within a separate housing that is permanently or removably attached to the power strip housing is not precluded. Furthermore, when contained within its own housing, the voice message playback system can be produced as a separate device, which is then attached to or retrofit onto a preexisting power strip. In this regard, there can also be provided a voice message playback system configured to be utilized in conjunction with a power strip having first and second outlets. In an embodiment, the voice message playback system can include: (i) first and second user inputs; (ii) a memory disposed in the housing and configured to store first and second voice messages identifying which devices are plugged into which of the first and second outlets; (iii) a speaker; and (iv) a controller coupled to the first and second user inputs, to the memory, and to the speaker. The controller is configured to play the first voice message through the speaker when the first user input is actuated and to playback the second voice message through the speaker when the second user input is actuated.

While multiple exemplary embodiments have been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set-forth in the appended Claims.

What is claimed is:

1. A power strip, comprising:
    a housing;
    multiple outlets located on the housing into which electronic devices can be plugged; and
    a voice message playback system coupled to the housing, the voice message playback system comprising:
        a memory storing multiple voice messages, each assigned to a different one of the multiple outlets; and
        a plurality of user inputs enabling a user to playback the multiple voice messages to identify which, if any, electronic devices are plugged into the multiple outlets, the plurality of user inputs each utilized to trigger playback of a different one of the multiple voice messages.

2. The power strip of claim 1 wherein the voice message playback system further comprises:
    a microphone
    which any one of the multiple voice messages can be rerecorded when selected by a user utilizing the plurality of user inputs.

3. The power strip of claim 1 wherein the plurality of user inputs comprises a plurality of buttons.

4. The power strip of claim 1 wherein the plurality of user inputs are each visually associated with a different one of the multiple outlets.

5. The power strip of claim 1 wherein the plurality of user inputs are each positioned adjacent a different one of the multiple outlets.

6. The power strip of claim 5 wherein the plurality of user inputs are each located substantially opposite a female ground terminal of one of the multiple outlets.

7. The power strip of claim 1 wherein the plurality of user inputs comprises:
    a first user input triggering playback of a first voice message included in the multiple voice messages when actuated in a first manner and commencing rerecording of the first voice message when actuated in a second manner; and
    a second user input triggering playback of a second voice message included in the multiple voice messages when actuated in the first manner and commencing rerecording of the first voice message when actuated in the second manner.

8. The power strip of claim 7 wherein the first user input comprises a first button, wherein the first button triggers playback of the first voice message when pressed for a duration less than a predetermined threshold and enables a user to rerecord the first voice message when held for a duration greater than the predetermined threshold.

9. The power strip of claim 1 wherein the voice message playback system is integrated into the housing.

10. A power strip, comprising:
    a housing;
    multiple outlets coupled to the housing; and
    a voice message playback system, comprising:
        a memory disposed in the housing and storing a plurality of voice messages each corresponding to a different one of the multiple outlets;
        a user interface; and
        a controller coupled to the memory and to the user interface, the user interface integrated into the housing and cooperating with the controller to enable a user to select amongst the plurality of voice messages by providing user commands selecting any one of the multiple outlets so as to trigger playback of the voice message corresponding to the selected outlet.

11. The power strip of claim 10 further comprising a plurality of user inputs located on the housing and each corresponding to a different one of the multiple outlets.

12. The power strip of claim 11 wherein each of the plurality of user inputs is visually associated with a different one of the multiple outlets.

13. The power strip of claim 11 wherein the plurality of user inputs comprises a plurality of buttons located adjacent the multiple outlets.

14. The power strip of claim 10 wherein the multiple outlets comprise first and second outlets, wherein the memory stores first and second voice messages, wherein the user interface comprises first and second user inputs, and wherein the controller is configured to: (i) initiate playback of the first voice message when the first user input is actuated in a first manner, and (ii) initiate playback of the second voice message when the second user input is actuated in the first manner.

15. The power strip of claim 14 wherein the controller is further configured to: (i) commence rerecording of the first voice message when the first user input is actuated in a second manner different than the first manner, and (ii) commence rerecording of the second voice message when the second user input is actuated in the second manner.

16. A voice message playback system utilized in conjunction with a power strip having a housing and first and second outlets, the voice message playback system comprising:
first and second user inputs;
a memory configured to store first and second voice messages corresponding to the first and second outlets, respectively;
a speaker; and
a controller coupled to the first and second user inputs, to the memory, and to the speaker, the controller configured to playback the first voice message through the speaker when the first user input is actuated in a first manner and to playback the second voice message through the speaker when the second user input is actuated in the first manner;
wherein the voice message playback system is integrated into or removably attached to the housing of the power strip, and wherein the controller further enables a user to rerecord the first voice message when the first user input is actuated in a second manner and to rerecord the second voice message when the second user input is actuated in the second manner.

17. The voice message playback system of claim 16 wherein the first and second user inputs comprise first and second buttons, respectively.

18. The voice message playback system of claim 17 wherein the first and second buttons are located on the housing of the power strip and visually associated with the first and second outlets, respectively.

19. The voice message playback system of claim 18 wherein the first and second buttons are positioned adjacent the first and second outlets, respectively.

20. The voice message playback system of claim 17 wherein playback of the first voice message is triggered when the first button is pressed for a duration less than a predetermined threshold, and wherein rerecording of the first voice message is triggered when the first button is held for a duration greater than the predetermined threshold.

* * * * *